(12) United States Patent
Yamamoto

(10) Patent No.: US 8,483,612 B2
(45) Date of Patent: Jul. 9, 2013

(54) VEHICLE-TO-ROADSIDE AND VEHICLE-TO-VEHICLE COMMUNICATION SYSTEM, COMMUNICATION METHOD, AND COMMUNICATION CONTROL PROGRAM THEREOF

(75) Inventor: Takeshi Yamamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 1033 days.

(21) Appl. No.: 12/021,463

(22) Filed: Jan. 29, 2008

(65) Prior Publication Data

US 2008/0200121 A1 Aug. 21, 2008

(30) Foreign Application Priority Data

Feb. 20, 2007 (JP) ................. 2007-039556

(51) Int. Cl.
*H04B 7/00* (2006.01)

(52) U.S. Cl.
USPC ........................................ 455/41.2

(58) Field of Classification Search
USPC ............... 455/41.2, 41.3, 436, 444; 709/200
See application file for complete search history.

(56) References Cited

U.S. PATENT DOCUMENTS

2004/0230370 A1* 11/2004 Tzamaloukas ................ 701/200

FOREIGN PATENT DOCUMENTS

| JP | 10-105880 A | 4/1998 |
|---|---|---|
| JP | 2002232948 A | 8/2002 |
| JP | 2004248180 A | 9/2004 |
| JP | 2006166307 A | 6/2006 |
| JP | 2006333335 A | 12/2006 |

OTHER PUBLICATIONS

Japanese Office Action for JP2007-039556 issued Jun. 21, 2011.
K. Saito et al., "Application of vehicle-to-vehicle communication and development of evaluation system for Internet ITS", Technical report of the Institute of Electronics, Information and Communication Engineers, Japan, The institute of Electronics, Information and Communication Engineers, vol. 104, No. 762, Mar. 22, 2005, pp. 29-34, ITS2004-94.
Japanese Office Action for JP2011-205759 mailed on Sep. 18, 2012.

* cited by examiner

*Primary Examiner* — Lewis West

(57) ABSTRACT

To resolve the problems of the vehicle-to-roadside communication and the vehicle-to-vehicle communication, and to enhance the safety of the road traffic and the convenience of the user by expanding the communication providing area and further stabilizing the communication. A vehicle-to-roadside and vehicle-to-vehicle communication system including a plurality of roadside communication devices being arranged on a roadside with a narrow range communication area, and an on-board communication device mounted on a vehicle which travels with passing through the communication area, and carrying out a wireless communication by cooperating a vehicle-to-roadside communication and a vehicle-to-vehicle communication is provided; where the roadside communication device and the on-board communication device are configured to be mutually communicable through two wireless channels, and the on-board communication device is configured to execute channel switching after notifying channel switching to a communicating party via wireless channel in communication when switching the channel from one to the other.

17 Claims, 5 Drawing Sheets

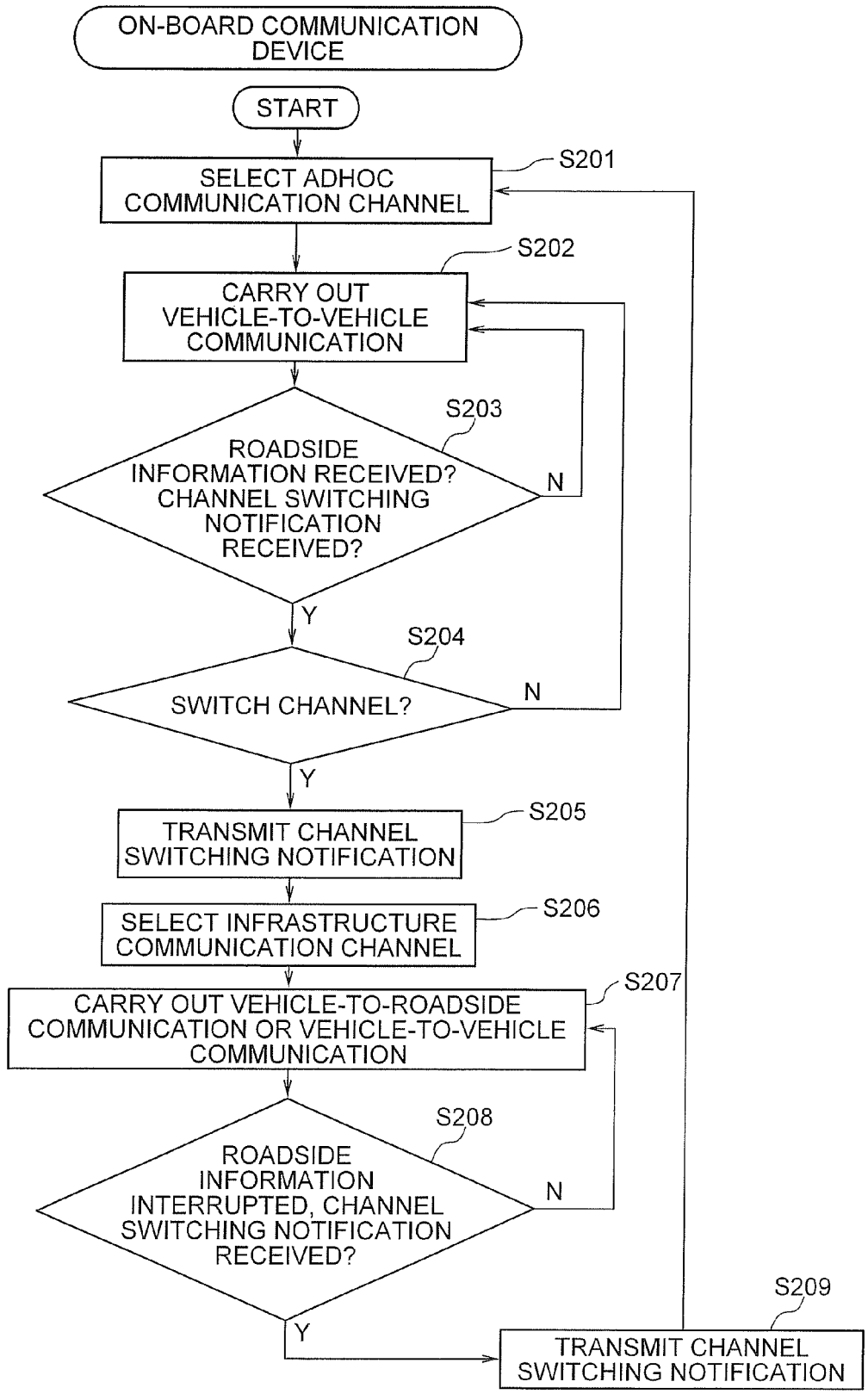

VEHICLE-TO-ROADSIDE AND VEHICLE-TO-VEHICLE COMMUNICATION SYSTEM, COMMUNICATION METHOD, AND COMMUNICATION CONTROL PROGRAM THEREOF

CROSS-REFERENCE TO RELATED APPLICATION

This application is based upon and claims the benefit of priority from Japanese patent application No. 2007-039556, filed on Feb. 20, 2007, the disclosure of which is incorporated herein in its entirety by reference.

BACKGROUND OF THE INVENTION

1. Field of the Invention

The present invention relates to vehicle-to-roadside and vehicle-to-vehicle communication systems, communication methods, and communication control programs thereof, in particular, to a vehicle-to-roadside and vehicle-to-vehicle communication system including a vehicle-to-roadside communication and vehicle-to-vehicle communication function and a channel switching function, a communication method, and a communication control program thereof.

2. Background Art

A system of arranging a roadside communication device on the side of a road, service area and the like, and providing road information and content to the traveling vehicle is known. Normally, the system transmits and receives data with an on-board communication device within an area the radio wave from the roadside communication device can reach (see Japanese Laid-Open Patent Publication No. 2002-232948 (patent document 1)).

However, in such system, the service can be provided only when the vehicle is in the area where the radio wave from the roadside communication device reaches, and service is not provided to vehicles in traffic or waiting in line for service. Therefore, the driver in traffic or waiting in line cannot obtain the necessary information while waiting and may feel annoyance.

When desiring to provide service to all the vehicles in traffic, the roadside communication devices are required to be arranged at a constant interval on all the roads in the country, which requires an enormous cost for infrastructure building.

In order to solve such problem, an example has been disclosed. According to it, a pseudo-roadside communication device, having a communication function which is the same as a function of the roadside communication device used in the vehicle-to-roadside communication, is arranged in the vehicle, so that data transmitted from the roadside communication device is relayed through the on-board communication device and the pseudo-roadside communication device of each vehicle, and information is provided to vehicles even if they are distant from the roadside communication device (see Japanese Laid-Open Patent Publication No. 2006-166307 (patent document 2)).

Also, an example which uses the vehicle-to-vehicle communication and the vehicle-to-roadside communication simultaneously for enhancing reliability, safety, and smoothness of an automatic operation system has been proposed (see Japanese Laid-Open Patent Publication No. 10-105880 (patent document 3)).

However, in the communication system proposed in patent document 1, communication can be performed only within the range where the radio wave from the roadside communication device reaches, and thus service cannot be provided to vehicles in traffic or waiting in line for service as described above.

In the vehicle-to-vehicle communication, on the other hand, the service providing area is not limited to a specific area, but communication cannot be established unless the vehicle mounted with the on-board communication device is present nearby. Therefore, it is desired that the service providing area by the vehicle-to-roadside communication and the vehicle-to-vehicle communication are complemented with each other to enhance safety and convenience.

By the way, in the example of patent document 2 aiming to complement the deficiencies caused by performing the vehicle-to-roadside communication and the vehicle-to-vehicle communication, the cost for the roadside communication device infrastructure building can be reduced, but on the other hand cost increases as the on-board communication device for the vehicle-to-roadside communication and the pseudo-roadside communication device similar to the roadside communication device for the vehicle-to-vehicle communication is required to be arranged as the on-board communication device, whereby cost can not be reduced in the system as a whole. This example is formed on the premise that the vehicle users bear a burden, so the problems still remain.

Patent document 3 discloses a system specialized for automated driving, and has an aspect different from the information communication system in that its main aim is to detect the position of the roadside communication device and the other vehicles. And, similar to the example of patent document 2, patent document 3 has a drawback in that two communication equipments, for the vehicle-to-vehicle communication and the vehicle-to-roadside communication, are required to be mounted.

SUMMARY OF THE INVENTION

It is an exemplary object of the invention to provide a vehicle-to-roadside and vehicle-to-vehicle communication system, a communication method, and a communication control program thereof, for acquiring the information of wide range in real time, which is necessary for the traveling vehicle and enhancing safety on road traffic and convenience of the user by effectively cooperating both the vehicle-to-roadside communication and the vehicle-to-vehicle communication.

In order to achieve the exemplary object, a vehicle-to-roadside and vehicle-to-vehicle communication system according to the present invention relates to a system including a plurality of roadside communication devices being arranged on a roadside with a narrow communication range, and an on-board communication device mounted on a vehicle which travels with passing through the communication area and being configured to perform a wireless communication by cooperating a vehicle-to-roadside communication between the roadside communication device and the on-board communication device and a vehicle-to-vehicle communication between each of the on-board communication devices; wherein the roadside communication device and the on-board communication device are mutually communicable via two wireless channels, which are first and second wireless channels, in the vehicle-to-roadside communication and the vehicle-to-vehicle communication; and the on-board communication device is configured to execute channel switching after notifying channel switching to a communicating party via wireless channel in communication when switching the channel from one to the other.

In order to achieve the above exemplary object, the vehicle-to-roadside and vehicle-to-vehicle communication method according to the present invention relates to a method in a vehicle-to-roadside and vehicle-to-vehicle communication system including a plurality of roadside communication devices being arranged on a side of a road with a narrow communication range, and an on-board communication device mounted on a vehicle which travels with passing through the communication area and being configured to perform a wireless communication by cooperating a vehicle-to-roadside communication between the roadside communication device and the on-board communication device and a vehicle-to-vehicle communication between each of the on-board communication devices, the method according to the an exemplary aspect of the invention including, on the roadside communication device side in the vehicle-to-roadside communication described above, roadside information setting step of setting roadside information such as positional information of the roadside communication device and wireless frequency channel to be used in a roadside information providing unit based on input data from an external connection unit installed in advance; channel selecting step of sending the set roadside information and a channel selecting signal for selecting a wireless channel to be used in transmission towards a roadside control unit; and roadside information transmitting step of selecting a wireless channel to be used when a roadside wireless unit is activated based on a command from the roadside control unit to transmits the roadside information, and transmitting the roadside information to the traveling vehicle via the selected wireless channel.

With this, the roadside information necessary for the traveling vehicle side can be transmitted from the roadside communication device effectively and reliably.

Further, in order to achieve the above exemplary object, the vehicle-to-roadside and vehicle-to-vehicle communication method according to the present invention relates to a method in a vehicle-to-roadside and vehicle-to-vehicle communication system including a plurality of roadside communication devices being arranged on a side of a road with a narrow communication range, and an on-board communication device mounted on a vehicle which travels with passing through the communication area and being configured to perform a wireless communication by cooperating a vehicle-to-roadside communication between the roadside communication device and the on-board communication device and a vehicle-to-vehicle communication between each of the on-board communication devices, the method according to the another exemplary aspect of the invention including, on the on-board communication device side in the vehicle-to-vehicle communication, received data retrieving control step of retrieving received data sent from the roadside communication device or another on-board communication device and received at a vehicle side wireless unit via a wireless channel set in advance; channel selecting determining step of transmitting the received data from the roadside communication device of the retrieved received data to an external connection unit installed in advance, and determining whether switching the wireless channel in communication is necessary or not based on the received data from the roadside communication device and the another on-board communication device in a channel selecting information determining unit; channel setting signal generating step of generating a channel setting signal in the vehicle side control unit based on a channel switching notification outputted from the channel selecting information determining unit and on-board communication device input data provided from the external connection unit when it is determined that switching of the wireless channel in communication is necessary; and transmission data transmitting step of activating the vehicle side wireless unit by the generated channel setting signal to set and switch for selecting a wireless channel for communication, and transmitting the transmission data which is transmitted from the vehicle side control unit towards the another on-board communication device or the roadside communication device via the selected wireless channel.

With this, efficient mutual communication with another on-board communication device or the roadside communication device can be realized.

Furthermore, in order to achieve the above exemplary object, the vehicle-to-roadside and vehicle-to-vehicle communication method according to the present invention relates to a method in a vehicle-to-roadside and vehicle-to-vehicle communication system including a plurality of roadside communication devices being arranged on a side of a road with a narrow range communication area, and an on-board communication device mounted on a vehicle which travels with passing through the communication area and being configured to perform a wireless communication by cooperating a vehicle-to-roadside communication between the roadside communication device and the on-board communication device and a vehicle-to-vehicle communication between each of the on-board communication devices, the method according to the still another exemplary aspect of the invention including vehicle-to-vehicle communication starting step in which the on-board communication device selects an adhoc communication channel as a wireless channel and starts the vehicle-to-vehicle communication in the vehicle-to-vehicle communication; channel switching determining step of determining whether or not to switch the wireless channel in communication when the on-board communication device receives the roadside information from the roadside communication device or a channel switching notification from another on-board communication device via the adhoc communication channel; channel switching executing step of switching the wireless channel in communication from the adhoc communication channel to an infrastructure communication channel after transmitting the channel switching notification to the neighboring on-board communication devices when determined to switch the wireless channel in communication; and second channel switching step of switching to the adhoc communication channel after notifying channel switching to the roadside communication device when the roadside information is no longer received during the vehicle-to-roadside communication via the infrastructure communication channel.

With this, the on-board communication device can efficiently execute switching communication with another on-board communication device or the roadside communication device.

Still further, in order to achieve the above exemplary object, the vehicle-to-roadside and vehicle-to-vehicle communication program according to the present invention relates to a program in a vehicle-to-roadside and vehicle-to-vehicle communication system including a plurality of roadside communication devices being arranged on a side of a road with a narrow range communication area, and an on-board communication device mounted on a vehicle which travels with passing through the communication area and being configured to perform a wireless communication by cooperating a vehicle-to-roadside communication between the roadside communication device and the on-board communication device and a vehicle-to-vehicle communication between each of the on-board communication devices, the program according to the still another exemplary aspect of the invention causing a computer in the roadside communication device to execute roadside information setting function of setting roadside information such as positional information of the roadside communication device and wireless frequency channel to be used in a roadside information providing unit based on input data from an external connection unit installed in advance in the vehicle-to-roadside communication; channel selecting signal output control function of sending the set roadside information and a channel selecting signal for selecting a wireless channel to be used in transmission towards a roadside control unit; and roadside information transmitting control function of selecting a wireless channel to be used to transmit the roadside information when a roadside wireless unit is activated based on a command from the roadside control unit, and transmitting the roadside information to the traveling vehicle via the selected wireless channel.

Still further, in order to achieve the above exemplary object, the vehicle-to-roadside and vehicle-to-vehicle communication program according to the present invention relates to a program in a vehicle-to-roadside and vehicle-to-vehicle communication system including a plurality of roadside communication devices being arranged on a side of a road with narrow range communication area, and an on-board communication device mounted on a vehicle which travels with passing through the communication area and being configured to perform a wireless communication by cooperating a vehicle-to-roadside communication between the roadside communication device and the on-board communication device and a vehicle-to-vehicle communication between each of the on-board communication devices, the program according to the still another exemplary aspect of the invention causing a computer in the on-board communication device to execute received data retrieving control function of retrieving received data from the roadside communication device or another on-board communication device received at an vehicle side wireless unit via a wireless channel set in advance in the vehicle-to-vehicle communication; channel selecting determining function of transmitting the received data from the roadside communication device of the retrieved received data to an external connection unit installed in advance, and determining whether switching the wireless channel in communication is necessary or not based on the received data from the roadside communication device and the another on-board communication device in a channel selecting information determining unit; switching control signal generating function of generating a channel switching control signal in the vehicle side control unit based on a channel switching notification outputted from the channel selecting information determining unit and on-board communication device input data provided from the external connection unit when it is determined that switching of the wireless channel in communication is necessary; and transmission data transmitting control function of activating the vehicle side wireless unit by the generated channel switching control signal to switch for selecting a communication wireless channel, and transmitting the transmission data which is transmitted from the vehicle side control unit towards the another on-board communication device or the roadside communication device via the selected wireless channel.

Still further, in order to achieve the above exemplary object, the vehicle-to-roadside and vehicle-to-vehicle communication program according to the present invention relates to a program in a vehicle-to-roadside and vehicle-to-vehicle communication system including a plurality of roadside communication devices being arranged on a side of a road with a narrow range communication area, and an on-board communication device mounted on a vehicle which travels with passing through the communication area and being configured to perform a wireless communication by cooperating a vehicle-to-roadside communication between the roadside communication device and the on-board communication device and a vehicle-to-vehicle communication between each of the on-board communication devices, the program according to the still another exemplary aspect of the invention causing a computer in the on-board communication device to execute vehicle-to-vehicle communication starting control function in which the on-board communication device selects an adhoc communication channel as a wireless channel and starts the vehicle-to-vehicle communication in the vehicle-to-vehicle communication; channel switching determining function of determining whether or not to switch the wireless channel in communication when the on-board communication device receives the roadside information from the roadside communication device or a channel switching notification from another on-board communication device via the adhoc communication channel; channel switching executing control function of switching the wireless channel in communication from the adhoc communication channel to an infrastructure communication channel after transmitting the channel switching notification to the neighboring on-board communication devices when it is determined to switch the wireless channel in communication; and second channel switching control function of switching to the adhoc communication channel after notifying channel switching to the roadside communication device when the roadside information is no longer received during the vehicle-to-roadside communication via the infrastructure communication channel.

As an exemplary advantage according to the invention, vehicle-to-roadside and vehicle-to-vehicle communication system, communication method and communication control program are provided capable of reliably retrieving the roadside information through communication in which the channel is switched in correspondence to change in communication situation originating from the movement of the vehicle using two channels, and enabling collection of information through a vehicle-to-vehicle communication even at an area distant from a wireless communication area of the roadside communication device, thereby enhancing safety of the road traffic and convenience of the vehicle user while compensating the drawbacks of the vehicle-to-roadside communication and the vehicle-to-vehicle communication and exhibiting the advantages, and reducing the development cost of the application software and the cost of the communication equipment by carrying out the vehicle-to-roadside communication and the vehicle-to-vehicle communication with the same communication equipment.

BRIEF DESCRIPTION OF THE DRAWINGS

FIG. 5 is a flowchart showing a channel selecting operation of the on-board communication device in the exemplary embodiment shown in FIG. 1.

EXEMPLARY EMBODIMENTS

One exemplary embodiment of the present invention will now be described in detail with reference to the drawings.

In describing the overall exemplary embodiment, the main parts in the present exemplary embodiment will be described first, and the specific configuration will be described thereafter.

Figure 1:
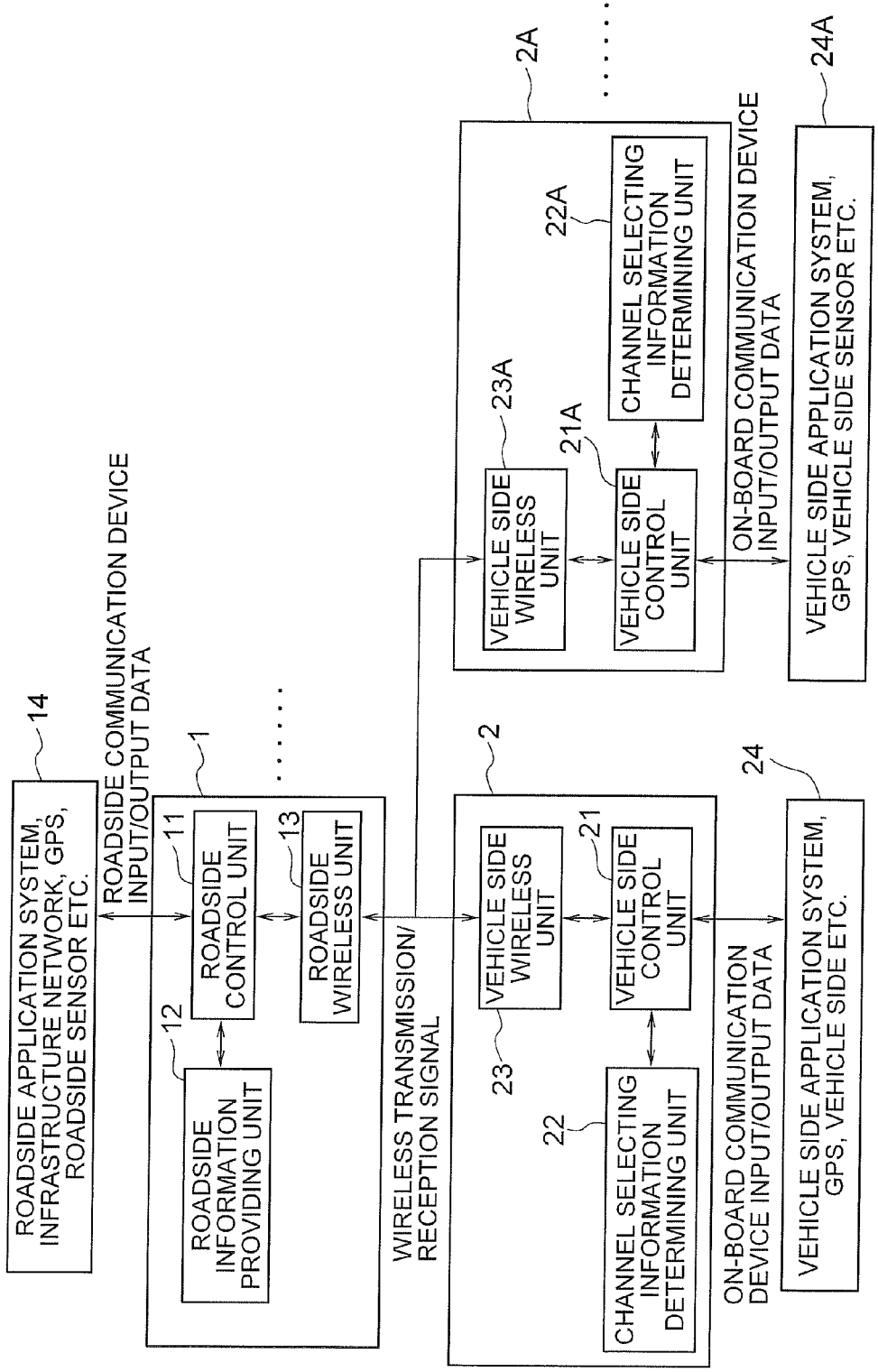
FIG. 1 is a block diagram showing a configuration of an exemplary embodiment of a traveling vehicle communication system according to the invention.

In FIG. 1, a traveling vehicle communication system in the present exemplary embodiment includes a plurality of roadside communication devices 1 being arranged on the side of the road with a narrow range communication area, and an on-board communication device 2 (2A) mounted on a vehicle which travels with passing through the communication area, where wireless communication is realized by cooperatively operating the vehicle-to-roadside communication between the roadside communication device 1 and the on-board communication device 2 (2A) and the vehicle-to-vehicle communication between each of the on-board communication devices. The on-board communication device 2 and another on-board communication device 2A have the same configuration in the present exemplary embodiment, and thus is represented as on-board communication device 2 unless it is necessary to be represented otherwise.

The roadside communication device 1 and the on-board communication device 2 are configured to be mutually communicable through two wireless channels, which are first and second wireless channels, in both the vehicle-to-roadside communication and the vehicle-to-vehicle communication, respectively, where the on-board communication device 2 is configured to execute channel switching after notifying channel switching to the communicating party via wireless channel in communication when switching the channel from one to the other.

Assuming the first wireless channel is an infrastructure communication channel and the second wireless channel is an adhoc communication channel, the vehicle-to-roadside communication and the vehicle-to-vehicle communication can be carried out using an existing network configuration, that is, a communication using the infrastructure configuration in which a base station and a fixed station are arranged in the roadside communication device 1 and a communication using the adhoc network of transmitting data in wireless communication between the on-board communication devices 2, and thus communication software and components used for communication can be inexpensively realized.

With this, communication can be executed with the communication channel switched by the roadside communication device 1, and the vehicle-to-roadside communication and the vehicle-to-vehicle communication can be carried out with the same roadside communication device 1 by using two communication channels, whereby communication providing area can be made to be wider and the user's cost is reduced while reducing development cost of the application software, the communication equipment cost, and the like.

In the present exemplary embodiment, the first wireless channel is assumed as the infrastructure communication channel and the second wireless channel is assumed as the adhoc communication channel. With this, the vehicle-to-roadside communication and the vehicle-to-vehicle communication can be carried out using two different wireless channels, and communication can be continued by reliably changing the channel when the wireless communication range is changed, and thus a vehicle side communication system that is more stable and has high reliability can be realized.

The roadside communication device 1 is configured to use the infrastructure communication channel which is the first wireless channel in the vehicle-to-roadside communication, and selects either of the two wireless channels for transmission when transmitting the roadside information periodically to the neighboring on-board communication device 2.

The on-board communication device 2 described above is configured to use the adhoc communication channel which is the second wireless channel in the vehicle-to-vehicle communication. The roadside communication device 1 is configured to transmit the roadside information periodically to the adhoc communication channel.

When a plurality of infrastructure communication channels is arranged, one of the plurality of infrastructure communication channels is selected as a channel communicable with the roadside communication device based on the roadside information notified from the roadside communication device via the adhoc communication channel.

With this, a more stable channel can be selected as the infrastructure communication channel depending on the communication state to perform communication, a vehicle side communication system that is more stable and has high reliability can be realized.

The on-board communication device 2 is configured so that when receiving the roadside information from the roadside communication device 1 during the vehicle-to-vehicle communication in the adhoc communication channel or when receiving the channel switching notification from another on-board communication device 2A, determines whether to switch the channel, and executes channel switching to the infrastructure communication channel after notifying channel switching to the neighboring on-board communication device in executing the channel switching.

Figure 2:
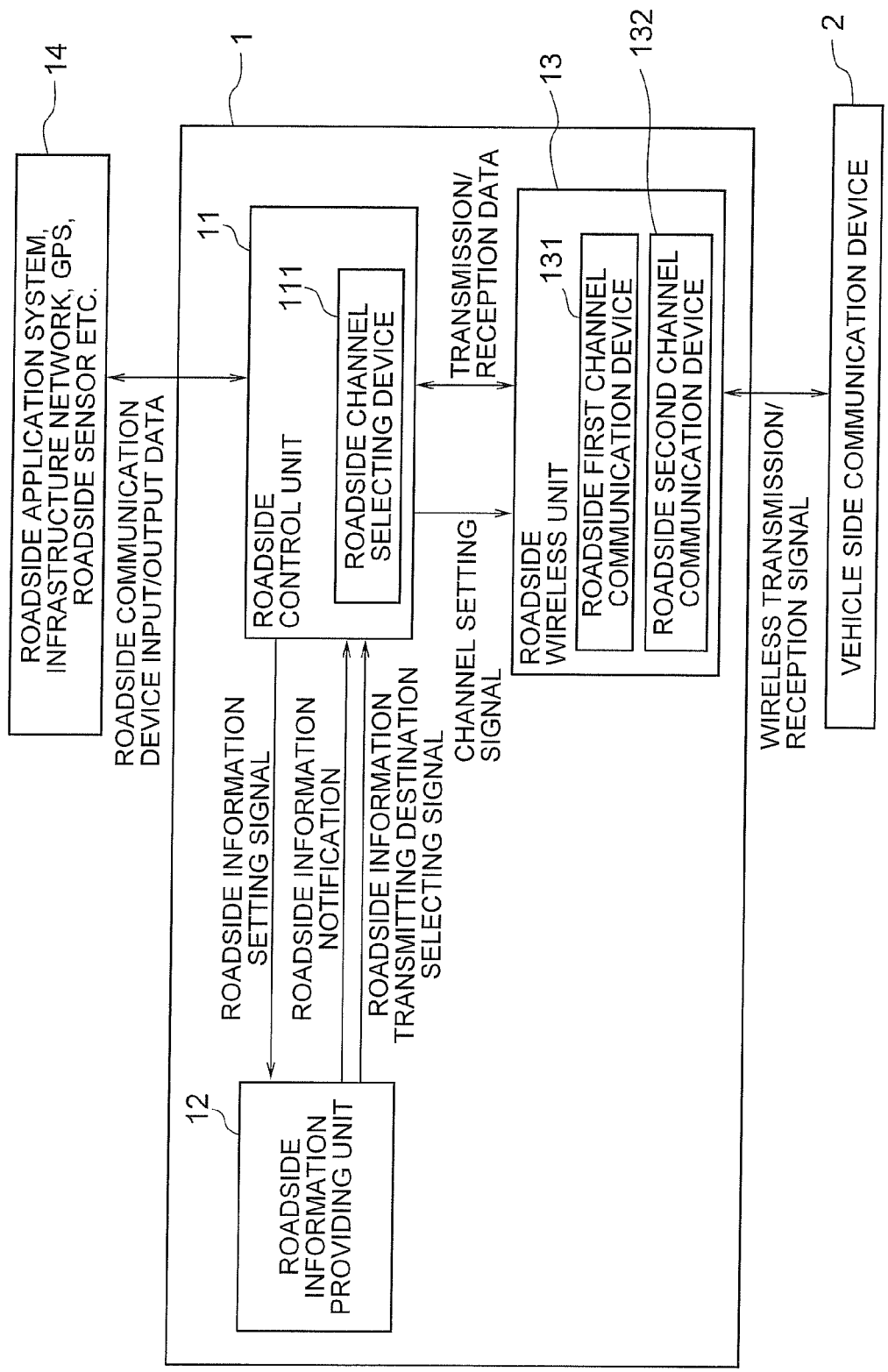
FIG. 2 is a detailed block diagram of a roadside communication device portion in the exemplary embodiment shown in FIG. 1.

As shown in FIG. 2, the roadside communication device 1 includes a roadside wireless unit 13 for transmitting roadside information such as positional information and wireless channel to the on-board communication device 2 of the traveling vehicle, a roadside information providing unit 12 for storing the roadside information in advance and selecting the wireless channel selectively used by the roadside wireless unit 13 and outputting the relevant information, and a roadside control unit 11 for selectively setting the roadside channel in the roadside wireless unit 13 based on the wireless channel selecting information from the roadside information providing unit 12 and regulating the operation of the roadside wireless unit 13 based thereon.

Figure 4:
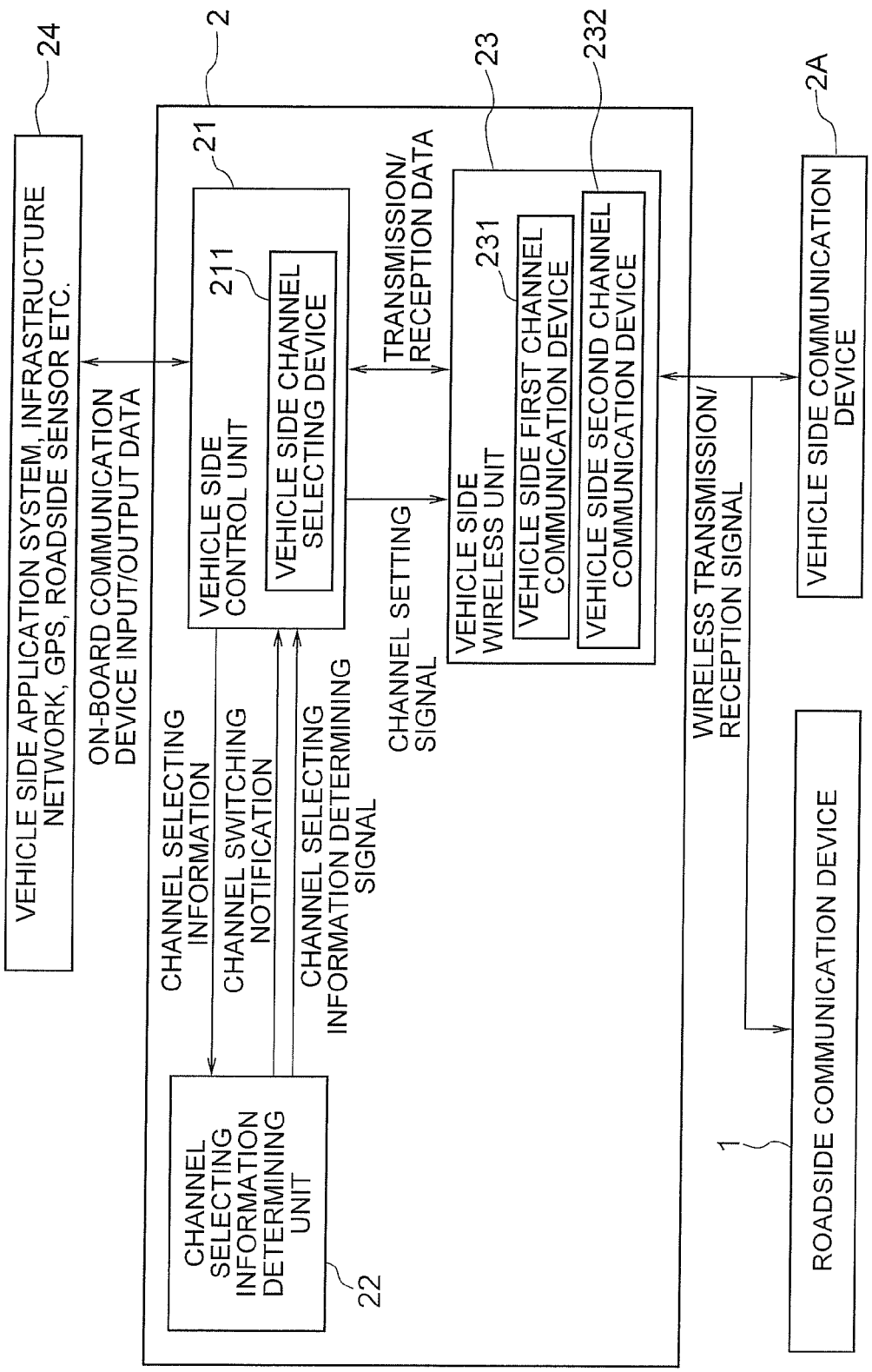
FIG. 4 is a detailed block diagram of an on-board communication device portion in the exemplary embodiment shown in FIG. 1.

Furthermore, as shown in FIG. 4, the on-board communication device 2 includes a vehicle side wireless unit 23 for executing reception or transmission/reception of a wireless signal and is input with received data from the roadside communication device 1 or from another on-board communication device 2A, a vehicle side control unit 21 for sending the received data which is received by the vehicle side wireless unit 23 to an external connection unit 24 installed in advance and controlling the switching operation when switching the wireless channel in the vehicle side wireless unit 23, and a channel selecting information determining unit 22 for determining the channel to be used in the vehicle side wireless unit 23 based on the roadside information from the roadside communication device 1 in the received data and the channel switching notification from another on-board communication device 2 and outputting a determination signal and a channel switching signal.

The vehicle side control unit 2 has a channel switching control function (vehicle side channel switching device 211) for controlling the switching operation of the wireless channel in the vehicle side wireless unit 21 based on the determination signal and the channel switching signal output from the channel selecting information determining unit 22.

Since channel selection is carried out based on the determination of the information determining unit, an advantage in that channel switching is reliably performed in a stable state in correspondence to the surrounding communication environment is achieved.

As shown in FIG. 2, the roadside wireless unit 13 described above includes a roadside first channel communication device 131 for performing wireless communication with the on-board communication device 2 using the first communication channel which is mainly used in the vehicle-to-roadside communication, and a roadside second channel communication device 132 for performing wireless communication with the on-board communication device 2 using the second communication channel which is mainly used in the vehicle-to-vehicle communication. The roadside control unit 11 includes a roadside channel selecting device 111 for selectively setting either the roadside first channel communication device 131 or the roadside second channel communication device 132 for the vehicle-to-roadside communication.

As shown in FIG. 4, the vehicle side wireless unit 23 described above includes a vehicle side first channel communication device 231 for performing wireless communication with another on-board communication device 2A using the first communication channel which is mainly used in the vehicle-to-vehicle communication, and a vehicle side second channel communication device 232 for performing wireless communication with another on-board communication device using the second communication channel which is mainly used in the vehicle-to-vehicle communication. The vehicle side control unit 21 includes a vehicle side channel selecting device 211 for selectively setting either the vehicle side first channel communication device 231 or the vehicle side second channel communication device 232 for the vehicle-to-roadside communication.

The infrastructure communication channel which is the first wireless channel described above is a channel used in the wireless communication method in which a communication equipment has a hierarchical configuration of parent station, base station, and child station. Alternatively, the adhoc communication channel which is the second wireless channel is a channel used in the communication method configured by a mutually direct communication such as cordless handsets connected by a wireless LAN.

As described above, the roadside communication device 1 is configured including the roadside wireless unit 13 for performing transmission/reception of the wireless signal with the on-board communication device 2, the roadside control unit 11 for controlling the flow of signals of the roadside communication device 1 and setting a wireless frequency channel for wireless communication of the roadside wireless unit 13, and the roadside information providing unit 12 for holding the roadside information such as a position where the roadside communication device 1 is installed and the wireless frequency channel to be used, and outputting the roadside information data.

The roadside communication device external connection unit 14 capable of connecting with an external device such as roadside application system, infrastructure network, GPS and various sensors is arranged next to the roadside communication device 1.

As described above, the on-board communication device 2 is configured including the vehicle side wireless unit 23 for performing transmission/reception of the wireless signal with the roadside communication device 1 or another on-board communication device 2A, the vehicle side control unit 21 for controlling the flow of signals of the on-board communication device 2 and setting the wireless frequency channel for the vehicle side wireless unit 23, and the channel selecting information determining unit 22 for determining the wireless frequency channel to be used based on the channel selecting information from the roadside communication device 1 or another on-board communication device 2.

An on-board communication device external connection unit 24 capable of being connected to an external device such as vehicle side application system, GPS and various on-board sensors, is arranged in the on-board communication device 2.

The functions of each component of the roadside communication device 1 described above will now be described in detail.

In FIGS. 1 and 2, the roadside control unit 11 of the roadside communication device 1 is inputted with the roadside communication device input data from the roadside communication device external connection unit 14 such as roadside application system and infrastructure network, and outputs the roadside information setting signal to the roadside information providing unit 12 and sets the roadside information including positional information of the roadside communication device 1 and the wireless frequency channel to be used.

The roadside communication device input data inputted from the roadside communication device external connection unit 14 may include weather information such as climate, temperature, humidity, amount of rainfall and accumulation of snow, traffic information of the road, disaster information such as earthquake and fire in related regions, required time information to the destination, news, sightseeing information of the destination, commercial information, and the like.

The roadside information providing unit 12 outputs a roadside information notification as well as a roadside information transmitting destination selecting signal for selecting the channel for transmitting the roadside information notification to the roadside control unit 11 described above.

The roadside control unit 11 outputs the transmission data serving as the information to be provided to the vehicle side transmitter 2 via radio to the roadside wireless unit 13 based on the roadside communication device input data provided from the roadside communication device external connection unit 14 and the roadside information notification provided by the roadside information providing unit 12.

The roadside control unit 11 includes the roadside channel selecting device 111, where the roadside channel selecting device 111 outputs a channel setting signal for setting the wireless frequency channel for transmitting the transmission data based on the roadside information transmitting destination selecting signal provided from the roadside information providing unit 12.

The roadside wireless unit 13 includes the roadside first channel communication device 131 for performing the vehicle-to-roadside communication using the infrastructure communication channel (first communication channel) and the roadside second channel communication device 132 for performing the vehicle-to-roadside communication using the adhoc communication channel (second communication channel), where the roadside wireless unit 13 converts the transmission data provided from the roadside control unit 11 into a wireless signal, and outputs the wireless transmission signal using the communication device 131 or 132 which carries out communication via the wireless frequency channel set by the channel setting signal transmitted from the roadside channel selecting device 111.

The roadside wireless unit 13 receives the wireless reception signal using the communication device 131 or 132 which uses the wireless frequency channel set by the channel setting signal from the roadside control unit 11, and outputs the received data to the roadside control unit 11.

The roadside control unit 11 receives the received data from either communication device 131 or 132 of the roadside wireless unit 13, and outputs the roadside communication device output data including the received data to the roadside communication device external connection unit 14.

Figure 3:
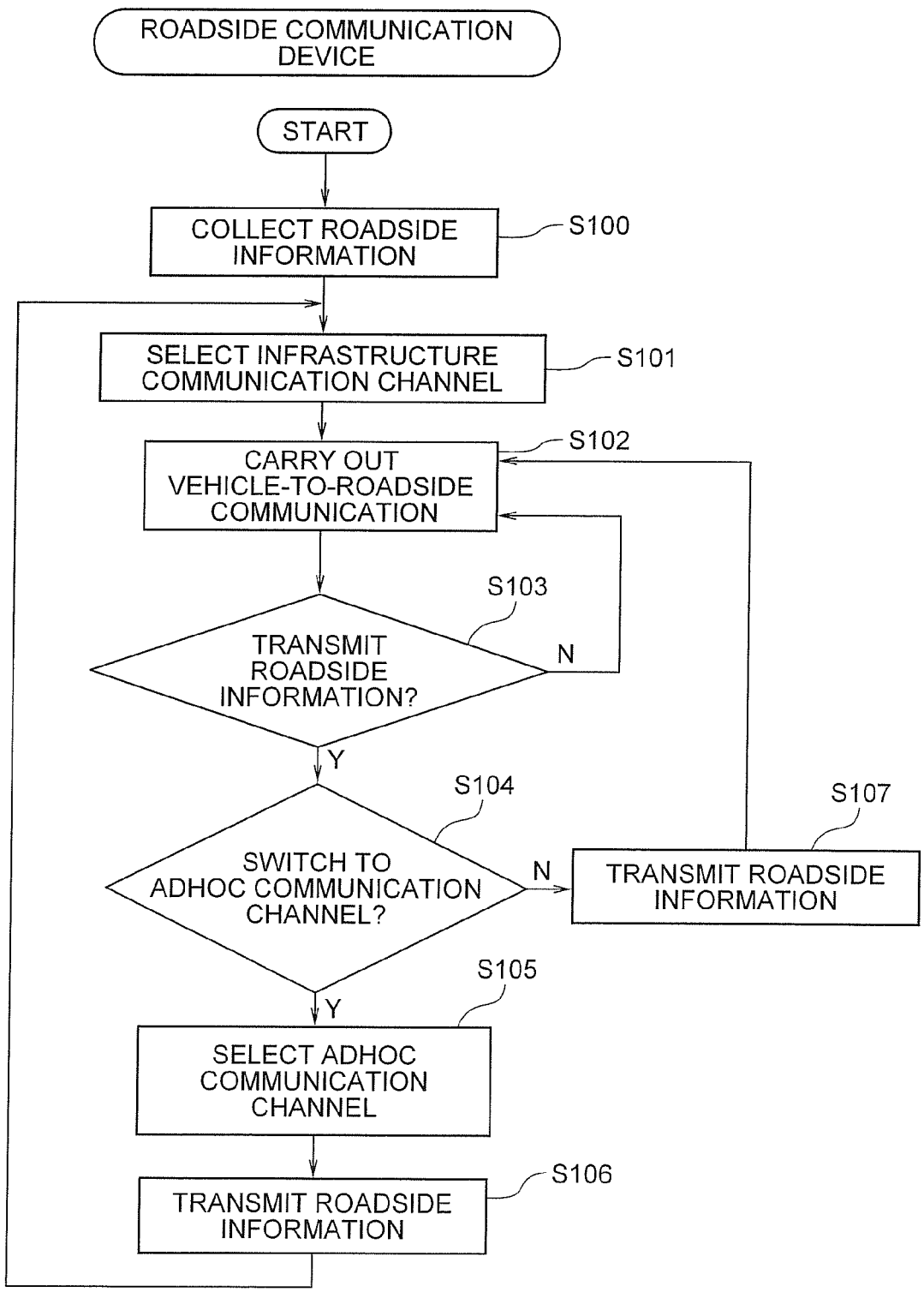
FIG. 3 is a flowchart showing a channel selecting operation of the roadside communication device in the exemplary embodiment shown in FIG. 1.

The channel selecting operation in the roadside communication device 1 described above will now be described with reference to the flowchart of FIG. 3.

The roadside communication device 1 sets the roadside information such as positional information and frequency channel to be used in the roadside information providing unit 12 through the roadside control unit 11 described above based on the input data from the external connection unit 10 arranged in advance in the vehicle-to-roadside communication (step S100: roadside information setting step). The roadside information set in the roadside information providing unit 12 and the channel selecting signal for selecting the wireless channel to be used in transmission are sent to the roadside control unit 11. As shown in FIG. 3, the roadside communication device 1 selects the roadside first channel communication device 131 of the roadside wireless unit 13 by means of the roadside channel selecting device 111 of the roadside control unit 11 (step S101: channel selecting step), and starts the vehicle-to-roadside communication using the infrastructure communication channel serving as the first wireless channel (step S102).

The roadside information is transmitted periodically to the neighboring on-board communication device 2 from the roadside communication device 1 described above, and the timing thereof is determined (step S103). If it is not the time of transmission, the process returns to step S102, and waits for the reception signal in the infrastructure communication channel (first communication channel).

When transmitting the roadside information from the roadside communication device 1, the roadside information is transmitted after selecting the transmitting channel (step S104). In this case, when selecting the infrastructure communication channel for transmitting the roadside information periodically from the roadside communication device 1, for example, the roadside information is transmitted in the infrastructure communication channel (step S107: roadside information transmitting step).

When transmitting the roadside information of the roadside communication device 1 via the adhoc communication channel (second communication channel) for transmitting to the on-board communication device 2 outside the communication range of the roadside communication device 1, for example, the roadside second channel communication device 132 of the roadside wireless unit 13 is selected by the roadside channel selecting device 111 of the roadside control unit 11 in step S105, and thereafter, the roadside information is transmitted using the adhoc communication channel (step S106: roadside information transmitting step).

After transmission, the process returns to step S101 and the roadside first channel communication device 131 is selected to return the communication to the infrastructure communication channel, and the vehicle-to-roadside communication is continuously carried out.

In each step, the executing content may be programmed and executed by a computer arranged in the roadside communication device 1 in advance.

Thus a computer program of the roadside communication device which causes the on-board communication device to recognize whether being in the reaching range of the radio wave from the roadside communication device or not by the roadside information transmitted from the roadside communication device, and causes the roadside communication device to execute the vehicle-to-roadside communication using two different channels according to the change in the wireless communication situation associated with the change in the vehicle position or the like can be provided.

Effects similar to the exemplary embodiment described above can be obtained in such manner.

The function and the operation of each component of the on-board communication device 2 described above will now be described in detail.

In FIG. 1 and FIG. 4, the vehicle side wireless unit 23 selects the vehicle side first channel communication device 231 or the vehicle side second channel communication device 232 by means of the channel setting signal from the vehicle side channel selecting device 211 of the vehicle side control unit 21, receives the wireless reception signal in the channel used by the communication device 231 or 232, and outputs the received data to the vehicle side control unit 21.

The vehicle side control unit 21 receives and retrieves the received data from the vehicle side wireless unit 23 (received data retrieving control step), and outputs the roadside communication device output data to the external connection unit 24 of the on-board communication device. The vehicle side control unit 21 receives the received data as described above and outputs the channel selecting information for determining the channel selection based on the roadside information from the roadside communication device 1 and the channel switching notification from another on-board communication device 2 to the channel selecting information determining unit 22.

In the channel selecting information determining unit 22 described above, which channel is to be used is determined based on the channel selecting information (channel selecting determining step), and the channel selecting information determining signal and the channel switching notification are output.

The vehicle side control unit 21 outputs the transmission data to the vehicle side wireless unit 23 as information to be provided to the roadside communication device 1 or other on-board communication device 2 via the wireless channel based on the on-board communication device input data provided from the external connection unit 24 of the on-board communication device side and the channel switching notification provided from the channel selecting information determining unit 22.

Furthermore, the vehicle side control unit 21 generates and outputs the channel setting signal for switching and setting the wireless frequency channel for transmitting the transmission data based on the channel selecting information determining signal provided from the channel selecting information determining unit 22 (channel setting signal generating step).

The vehicle side wireless unit 23 converts the transmission data provided from the vehicle side control unit 21 to the wireless signal, and transmits the wireless transmission signal towards another on-board communication device 2A or the roadside communication device 1 in the wireless channel set by the generated channel setting signal (transmission data transmitting step).

In each step, the executing content may be programmed and executed by a computer arranged in the roadside communication device 1 in advance. Effects similar to the exemplary embodiment described above are also obtained in such manner.

The channel selecting operation in the on-board communication device 2 will now be described with reference to the flowchart of FIG. 5.

The on-board communication device 2 described above selects the vehicle side second channel communication device 232 of the vehicle side wireless unit 23 and carries out the vehicle-to-vehicle communication using the adhoc communication channel (step S201, step S202: vehicle-to-vehicle communication starting step). When the roadside information is received via the adhoc communication channel from the roadside communication device 1 or when the channel switching notification is received from another on-board communication device 2A (step S203), whether to switch the channel is determined (step S204: channel switching determining step), where when switching, the channel switching notification is transmitted to the neighboring on-board communication device 2 (step S205), and thereafter the vehicle side first channel communication device 231 is selected to switch to the infrastructure communication channel (step S206: channel switching executing step).

When the roadside information transmitted periodically from the roadside communication device 1 can no longer be received in the vehicle-to-roadside communication in the infrastructure communication channel (step S207), the channel switching notification is transmitted (step S209), and thereafter, the process returns to step S201 to switch to the adhoc communication channel which is the second wireless channel (second channel switching step).

In case of receiving the channel switching notification from the on-board communication device 2 of the communicating party (step S208) when receiving the channel switching notification from another on-board communication device 2A and switching to the infrastructure communication channel for the vehicle-to-vehicle communication (step S207), the channel switching notification is transmitted (step S209), and thereafter, the channel is switched to the adhoc communication channel (step S201).

In each step, the executing content may be programmed and executed by a computer arranged in the roadside communication device 1 in advance.

Thus, the computer program of the roadside communication device which can execute the vehicle-to-vehicle communication and the vehicle-to-roadside communication with switching two different channels according to the reaching state of the radio wave from the roadside communication device is realized.

Effects similar to the exemplary embodiment described above can be obtained in such manner.

According to the above configuration and operation, while the vehicle is traveling through an area where the roadside communication device 1 is not installed, the on-board communication device 2 mounted on the relevant vehicle uses the adhoc communication channel (second wireless channel) to carry out the vehicle-to-vehicle communication with the on-board communication device 2 of another vehicle, and acquires the necessary information.

The roadside communication device 1 installed along the road and the like transmits the roadside information periodically to the adhoc communication channel. When the traveling vehicle receives the roadside information from the roadside communication device 1 by the on-board communication device 2, the vehicle is recognized as being in an area communicable with the roadside communication device 1, and the channel is switched to the infrastructure communication channel (first wireless channel) to carry out communication.

When performing channel switching, channel is switched after notifying the switch to the infrastructure communication channel (first wireless channel) to other vehicles via the adhoc communication channel (second wireless channel) in case the relevant vehicle is in communication with another vehicle in the vehicle-to-vehicle communication channel and it is required to continue the communication.

When receiving the channel switching notification from the on-board communication device 2 of the communicating party during the vehicle-to-vehicle communication via the adhoc communication channel (second wireless channel), and desiring to continuously communicate with the on-board communication device 2, the channel switching notification is transmitted via the adhoc communication channel (second wireless channel) and thereafter the channel is switched to the infrastructure communication channel (first wireless channel) to carry out the vehicle-to-vehicle communication through the roadside communication device 1.

When the on-board communication device 2 carries out the vehicle-to-roadside communication via the infrastructure communication channel (first wireless channel), the roadside information transmitted periodically from the roadside communication device 1 is checked, and if the roadside information is interrupted, the channel switching notification is transmitted via the infrastructure communication channel (first wireless channel) and thereafter the channel is switched to the adhoc communication channel (second wireless channel).

When the on-board communication device 2 receives the channel switching notification from the on-board communication device 2 of the communicating party during the vehicle-to-vehicle communication via the infrastructure communication channel (first wireless channel), the channel switching notification is transmitted via the infrastructure communication channel (first transmission channel) and thereafter the channel is switched to the adhoc communication channel (second wireless channel).

In the traveling vehicle communication system of the present exemplary embodiment, while the vehicle is traveling through an area where the roadside communication device 1 is not installed, the on-board communication device 2 mounted on the relevant vehicle uses the adhoc communication channel (second wireless channel) to carry out the vehicle-to-vehicle communication with the on-board communication device 2 of another vehicle. In this case, the roadside communication device 1 installed along the roadside and the like transmits the roadside information periodically to the adhoc communication channel (second wireless channel). When the traveling vehicle receives the roadside information from the roadside communication device 1, the vehicle is recognized as being in an area communicable with the roadside communication device 1, and the channel is switched to the infrastructure communication channel (first wireless channel).

The traveling vehicle communication system in the present exemplary embodiment has the first wireless channel as the infrastructure communication channel and the second wireless channel as the adhoc communication channel, whereby the vehicle-to-roadside communication and the vehicle-to-vehicle communication are carried out using two different wireless channels, and the channel is changed to continue the communication when the wireless communication area is changed so that a traveling vehicle communication system which is more stable and has higher reliability is realized. That is, communication can be executed with the communication channel switched by the roadside communication device, and the vehicle-to-roadside communication and the vehicle-to-vehicle communication can be carried out with the same roadside communication device by using two communication channels, whereby the communication providing area can be made to be wider.

Thus, when providing the service to enhance the safety of the road traffic or the convenience of the driver and the passenger, the service providing area covered by the vehicle-to-roadside communication and the service providing area covered by the vehicle-to-vehicle communication can be complemented with each other, and safety, convenience, and reliability of the communication can be further enhanced. The development cost of the application software, the communication equipment cost and the like can be reduced by building and operating the software and the equipment for the vehicle-to-roadside communication and the vehicle-to-vehicle communication in cooperation.

Another exemplary embodiment of the present invention will now be described. As a second exemplary embodiment of the invention, the first wireless channel may be an infrastructure communication channel, and the second wireless channel may be an adhoc communication channel.

With this, the vehicle-to-roadside communication and the vehicle-to-vehicle communication are carried out with using two different wireless channels, and the communication can be continually performed by changing the channel when the wireless communication area is changed, so that the vehicle side communication system that is more stable and has higher reliability is realized.

Further, as a third exemplary embodiment of the invention, the roadside communication device described above may be configured to use the infrastructure communication channel, which is the first wireless channel, in the vehicle-to-roadside communication, and may be configured to select one of the two wireless channels for transmission when transmitting roadside information periodically to the neighboring on-board communication devices.

Furthermore, as a fourth exemplary embodiment of the invention, the on-board communication device described above may be configured to use the adhoc communication channel, which is the second wireless channel, in the vehicle-to-vehicle communication; and the roadside communication device may have a function of transmitting the roadside information periodically to the adhoc communication channel.

Furthermore, as a fifth exemplary embodiment of the invention, when receiving the roadside information from the roadside communication device during the vehicle-to-vehicle communication via the adhoc communication channel or receiving a channel switching notification from another on-board communication device, the on-board communication device described above may determine whether to switch channels and executes channel switching to the infrastructure communication channel after notifying channel switching to the neighboring on-board communication devices in executing channel switching.

Furthermore, as a sixth exemplary embodiment of the invention, if a plurality of infrastructure communication channels is arranged, one of the plurality of infrastructure communication channels may be selected as a channel communicable with the roadside communication device based on the roadside information notified from the roadside communication device via the adhoc communication channel.

Furthermore, as a seventh exemplary embodiment of the invention, the roadside communication device described above may include, a roadside wireless unit for transmitting the roadside information such as positional information and wireless channel to the on-board communication device of the traveling vehicle, a roadside information providing unit for storing the roadside information in advance and selecting the wireless channel selectively used by the roadside wireless unit and outputting the information, and a roadside control unit for selectively setting a roadside channel in the roadside wireless unit based on the wireless channel selecting information from the roadside information providing unit and regulating the operation of the roadside wireless unit based thereon.

Furthermore, as an eighth exemplary embodiment of the invention, the on-board communication device described above may include, a vehicle side wireless unit for executing reception or transmission/reception of a wireless signal and input with received data from the roadside communication device or from another on-board communication device, an vehicle side control unit for sending the received data which is received by the vehicle side wireless unit to an external connection unit installed in advance and controlling the switching operation when switching the wireless channel in the vehicle side wireless unit, and a channel selecting information determining unit for determining the channel to be used in the vehicle side wireless unit based on the roadside information from the roadside communication device in the received data and the channel switching notification from another on-board communication device, and outputting a determination signal and a channel switching signal.

The vehicle side control unit described above has a channel switching control function (on-board channel switching device)of controlling the switching operation of the wireless channel in the vehicle side wireless unit based on the determination signal and the channel switching signal outputted from the channel selecting information determining unit.

Accordingly, since the channel selection can be made based on the determination of the information determining unit, channel switching can be reliably executed in a stable state according to the surrounding communication environment.

Furthermore, as a ninth exemplary embodiment of the invention, the roadside wireless unit described above may include a roadside first channel communication device for performing wireless communication with the on-board communication device using the first communication channel which is mainly used in the vehicle-to-roadside communication, and a roadside second channel communication device for performing wireless communication with the on-board communication device using the second communication channel which is mainly used in the vehicle-to-vehicle communication; wherein the roadside control unit described above includes a roadside channel selecting device for selectively setting either the roadside first channel communication device or the roadside second channel communication device for the vehicle-to-roadside communication.

Thus, an advantage of reliably performing switching control under the control of the roadside control unit is obtained.

Furthermore, as a tenth exemplary embodiment of the invention, the vehicle side wireless unit may include a vehicle side first channel communication device for performing wireless communication with another on-board communication device using the first communication channel which is mainly used in the vehicle-to-vehicle communication, and a vehicle side second channel communication device for performing wireless communication with another on-board communication device using the second communication channel which is mainly used in the vehicle-to-vehicle communication; wherein the vehicle side control unit includes a vehicle side channel selecting device for selectively setting either the vehicle side first channel communication device or the vehicle side second channel communication device for the vehicle-to-roadside communication.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

Industrial Applicability

As described above, the present invention is widely applicable to a system which performs a communication between the traveling vehicle and a fixed station and a communication between each of the traveling vehicles, enables a sharing of information related to the travel control of the vehicle, weather information, traffic information, and the like among the vehicles, enables a transmission of information on the front side in the advancing direction to the following vehicles, and can be used for safe driving and automatic drive control, and thus has a high possibility of being used in a wide field of automotive industry and road traffic industry such as expressway and the like.

What is claimed is:

1. A vehicle-to-roadside and vehicle-to-vehicle communication system comprising a plurality of roadside communication devices being arranged on a side of a road, and an on-board communication device mounted on a vehicle which travels with passing through the communication area and being configured to perform a wireless communication by cooperating a vehicle-to-roadside communication between the roadside communication device and the on-board communication device and a vehicle-to-vehicle communication between each of the on-board communication devices; wherein the roadside communication device and the on-board communication device are mutually communicable in the vehicle-to-roadside communication and the vehicle-to-vehicle communication via two wireless channels, which are an infrastructure communication channel and an adhoc communication channel, respectively;

the roadside communication device has a function of transmitting roadside information relating to the vehicle-to-roadside communication periodically to the adhoc communication channel; and the on-board communication device is configured to:

execute channel switching after notifying channel switching to a communicating party via wireless channel in communication when switching the channel from one to the other and continue the communication, and when receiving the roadside information from the roadside communication device or receiving a channel switching notification from another on-board communication device during the vehicle-to-vehicle communication via the adhoc communication channel, determine whether to switch channels according to a status of the vehicle-to-vehicle communication currently performed and execute channel switching to the infrastructure communication channel after notifying channel switching to the neighboring on-board communication devices in executing channel switching, wherein the roadside communication device includes, a roadside wireless unit for transmitting the roadside information including positional information and wireless channel to the on-board communication device of the traveling vehicle, a roadside information providing unit for storm the roadside information in advance and selecting the wireless channel selectively used by the roadside wireless unit and outputting information, and a roadside control unit for selectively setting a roadside channel in the roadside wireless unit based on the wireless channel selecting information from the roadside information providing unit and regulating the operation of the roadside wireless unit based thereon, wherein the roadside wireless unit includes a roadside first channel communication device for performing wireless communication with the on-board communication device using the first communication channel which is mainly used in the vehicle-to-roadside communication, and a roadside second channel communication device for performing wireless communication with the on-board communication device using the second communication channel which is mainly used in the vehicle-to-vehicle communication; wherein the roadside control unit includes a roadside channel selecting device for selectively setting either the roadside first channel communication device or the roadside second channel communication device for the vehicle-to-roadside communication.

2. The vehicle-to-roadside and vehicle-to-vehicle communication system according to claim 1, wherein the roadside communication device is configured to use the infrastructure communication channel, which is the first wireless channel, in the vehicle-to-roadside communication, and is configured to select one of the two wireless channels for transmission when transmitting roadside information periodically to the neighboring on-board communication devices.

3. The vehicle-to-roadside and vehicle-to-vehicle communication system according to claim 1, wherein if a plurality of infrastructure communication channels is arranged, one of the plurality of infrastructure communication channels is selected as a channel communicable with the roadside communication device based on the roadside information notified from the roadside communication device via the adhoc communication channel.

4. The vehicle-to-roadside and vehicle-to-vehicle communication system according to claim 1, wherein the on-board communication device includes, a vehicle side wireless unit for executing reception or transmission/reception of a wireless signal and input with received data from the roadside communication device or from another on-board communication device, a vehicle side control unit for sending the received data which is received by the vehicle side wireless unit to an external connection unit installed in advance and controlling the switching operation when switching the wireless channel in the vehicle side wireless unit, and a channel selecting information determining unit for determining the channel to be used in the vehicle side wireless unit based on the roadside information from the roadside communication device in the received data and the channel switching notification from another on-board communication device, and outputting a determination signal and a channel switching signal; wherein the vehicle side control unit has a channel switching control function of controlling the switching operation of the wireless channel in the vehicle side wireless unit based on the determination signal and the channel switching signal outputted from the channel selecting information determining unit.

5. A vehicle-to-roadside and vehicle-to-vehicle communication method in a vehicle-to-roadside and vehicle-to-vehicle communication system including a plurality of roadside communication devices being arranged on a side of a road, and an on-board communication device mounted on a vehicle which travels with passing through the communication area and being configured to perform a wireless communication by cooperating a vehicle-to-roadside communication between the roadside communication device and the on-board communication device and a vehicle-to-vehicle communication between each of the on-board communication devices, the method comprising:

setting roadside information including positional information of the roadside communication device and wireless frequency channel to be used in a roadside information providing unit based on input data from an external connection unit installed in advance on the roadside communication device side in the vehicle-to-roadside communication;

sending the set roadside information and a channel selecting signal for selecting a wireless channel to be used in transmission towards a roadside control unit; and selecting a wireless channel to be used to transmit the roadside information when a roadside wireless unit is activated based on a command from the roadside control unit, and transmitting the roadside information to the traveling vehicle via the selected wireless channel;

mutually communicating between the roadside communication device and the on-board communication device in the vehicle-to-roadside communication and the vehicle-to-vehicle communication via two wireless channels, which are an infrastructure communication channel and an adhoc communication channel, respectively;

transmitting the roadside information relating to the vehicle-to-roadside communication periodically to the adhoc communication channel;

executing channel switching after notifying channel switching to a communicating party via wireless channel in communication when switching the channel from one to the other and continuing the communication; and when receiving the roadside information from the roadside communication device or receiving a channel switching notification from another on-board communication device during the vehicle-to-vehicle communication via the adhoc communication channel, determining whether to switch channels according to a status of the vehicle-to-vehicle communication currently performed and executing channel switching to the infrastructure communication channel after notifying channel switching to the neighboring on-board communication devices in executing channel switching, wherein the method further comprises:

transmitting, by the roadside communication device, the roadside information including positional information and wireless channel to the on-board communication device of the traveling vehicle, storing, by the roadside communication device, the roadside information in advance and selecting the wireless channel selectively used by the roadside wireless unit and outputting information, selectively setting, by the roadside communication device, a roadside channel in the roadside wireless unit based on the wireless channel selecting information from the roadside information providing unit and regulating the operation of the roadside wireless unit based thereon, performing, by the roadside wireless unit, wireless communication with the on-board communication device using a first communication channel which is mainly used in the vehicle-to-roadside communication, performing, by the roadside wireless unit, wireless communication with the on-board communication device using a second communication channel which is mainly used in the vehicle-to-vehicle communication, selectively setting, by the roadside communication device, either a roadside first channel communication device or a roadside second channel communication device for the vehicle-to-roadside communication.

6. A vehicle-to-roadside and vehicle-to-vehicle communication method in a vehicle-to-roadside and vehicle-to-vehicle communication system including a plurality of roadside communication devices being arranged on a side of a road, and an on-board communication device mounted on a vehicle which travels with passing through the communication area and being configured to perform a wireless communication by cooperating a vehicle-to-roadside communication between the roadside communication device and the on-board communication device and a vehicle-to-vehicle communication between each of the on-board communication devices, the method comprising:

retrieving received data sent from the roadside communication device or another on-board communication device which is received at an vehicle side wireless unit via a wireless channel set in advance on the on-board communication device side in the vehicle-to-vehicle communication;

transmitting the received data from the roadside communication device of the retrieved received data to an external connection unit installed in advance, and determining whether switching the wireless channel in communication is necessary or not based on the received data from the roadside communication device and the another on-board communication device in a channel selecting information determining unit;

generating a channel setting signal in the vehicle side control unit based on a channel switching notification outputted from the channel selecting information determining unit and on-board communication device input data provided from the external connection unit when it is determined that switching of the wireless channel in communication is necessary; and activating the vehicle side wireless unit by the generated channel setting signal to set and switch for selecting a communication wireless channel, and transmitting the transmission data which is transmitted from the vehicle side control unit towards the another on-board communication device or the roadside communication device via the selected wireless channel;

mutually communicating between the roadside communication device and the on-board communication device in the vehicle-to-roadside communication and the vehicle-to-vehicle communication via two wireless channels, which are an infrastructure communication channel and an adhoc communication channel, respectively;

transmitting the roadside information relating to the vehicle-to-roadside communication periodically to the adhoc communication channel;

executing channel switching after notifying channel switching to a communicating party via wireless channel in communication when switching the channel from one to the other and continuing the communication; and when receiving the roadside information from the roadside communication device or receiving a channel switching notification from another on-board communication device during the vehicle-to-vehicle communication via the adhoc communication channel, determining whether to switch channels according to a status of the vehicle-to-vehicle communication currently performed and executing channel switching to the infrastructure communication channel after notifying channel switching to the neighboring on-board communication devices in executing channel switching, wherein the method further comprises:

transmitting, by the roadside communication device, the roadside information including positional information and wireless channel to the on-board communication device of the traveling vehicle, storing, by the roadside communication device, the roadside information in advance and selecting the wireless channel selectively used by the roadside wireless unit and outputting information, selectively setting, by the roadside communication device, a roadside channel in the roadside wireless unit based on the wireless channel selecting information from the roadside information providing unit and regulating the operation of the roadside wireless unit based thereon, performing, by the roadside wireless unit, wireless communication with the on-board communication device using a first communication channel which is mainly used in the vehicle-to-roadside communication, performing, by the roadside wireless unit, wireless communication with the on-board communication device using a second communication channel which is mainly used in the vehicle-to-vehicle communication, selectively setting, by the roadside communication device, either a roadside first channel communication device or a roadside second channel communication device for the vehicle-to-roadside communication.

7. A vehicle-to-roadside and vehicle-to-vehicle communication method in a vehicle-to-roadside and vehicle-to-vehicle communication system including a plurality of roadside communication devices being arranged on a side of a road, and an on-board communication device mounted on a vehicle which travels with passing through the communication area and being configured to perform a wireless communication by cooperating a vehicle-to-roadside communication between the roadside communication device and the on-board communication device and a vehicle-to-vehicle communication between each of the on-board communication devices, the method comprising:

selecting an adhoc communication channel as a wireless channel with the on-board communication device and starting the vehicle-to-vehicle communication in the vehicle-to-vehicle communication;

determining whether or not to switch the wireless channel in communication when the on-board communication device receives the roadside information from the roadside communication device or a channel switching notification from another on-board communication device via the adhoc communication channel;

switching the wireless channel in communication from the adhoc communication channel to an infrastructure communication channel after transmitting the channel switching notification to the neighboring on-board communication devices when it is determined to switch the wireless channel in communication; and switching to the adhoc communication channel after notifying channel switching to the roadside communication device when the roadside information is no longer received during the vehicle-to-roadside communication via the infrastructure communication channel;

mutually communicating between the roadside communication device and the on-board communication device in the vehicle-to-roadside communication and the vehicle-to-vehicle communication via two wireless channels, which are the infrastructure communication channel and the adhoc communication channel, respectively;

transmitting the roadside information relating to the vehicle-to-roadside communication periodically to the adhoc communication channel;

executing channel switching after notifying channel switching to a communicating party via wireless channel in communication when switching the channel from one to the other and continuing the communication; and when receiving the roadside information from the roadside communication device or receiving a channel switching notification from another on-board communication device during the vehicle-to-vehicle communication via the adhoc communication channel, determining whether to switch channels according to a status of the vehicle-to-vehicle communication currently performed and executing channel switching to the infrastructure communication channel after notifying channel switching to the neighboring on-board communication devices in executing channel switching, wherein the method further comprises:

transmitting, by the roadside communication device, the roadside information including positional information and wireless channel to the on-board communication device of the traveling vehicle, storing, by the roadside communication device, the roadside information in advance and selecting the wireless channel selectively used by the roadside wireless unit and outputting the information, selectively setting, by the roadside communication device, a roadside channel in the roadside wireless unit based on the wireless channel selecting information from the roadside information providing unit and regulating the operation of the roadside wireless unit based thereon, performing, by the roadside wireless unit, wireless communication with the on-board communication device using a first communication channel which is mainly used in the vehicle-to-roadside communication, performing, by the roadside wireless unit, wireless communication with the on-board communication device using a second communication channel which is mainly used in the vehicle-to-vehicle communication, selectively setting, by the roadside communication device, either a roadside first channel communication device or a roadside second channel communication device for the vehicle-to-roadside communication.

8. A vehicle-to-roadside and vehicle-to-vehicle communication control program in a vehicle-to-roadside and vehicle-to-vehicle communication system including a plurality of roadside communication devices being arranged on a side of a road, and an on-board communication device mounted on a vehicle which travels with passing through the communication area and being configured to perform a wireless communication by cooperating a vehicle-to-roadside communication between the roadside communication device and the on-board communication device and a vehicle-to-vehicle communication between each of the on-board communication devices, the program causing a computer in the roadside communication device to execute:

roadside information setting function of setting roadside information including positional information of the roadside communication device and wireless frequency channel to be used in a roadside information providing unit based on input data from an external connection unit installed in advance in the vehicle-to-roadside communication;

channel selecting output control function of outputting the set roadside information and a channel selecting signal for selecting a wireless channel to be used in transmission towards a roadside control unit; and roadside information transmitting control function of selecting a wireless channel to be used to transmit the roadside information when a roadside wireless unit is activated based on a command from the roadside control unit, and transmitting the roadside information to the traveling vehicle via the selected wireless channel;

a mutual communication function of mutually communicating between the roadside communication device and the on-board communication device in the vehicle-to-roadside communication and the vehicle-to-vehicle communication via two wireless channels, which are an infrastructure communication channel and an adhoc communication channel, respectively;

a roadside information transmission function of transmitting the roadside information relating to the vehicle-to-roadside communication periodically to the adhoc communication channel;

a channel switching function of executing channel switching after notifying channel switching to a communicating party via wireless channel in communication when switching the channel from one to the other and continuing the communication; and a determination and channel switching function of, when receiving the roadside information from the roadside communication device or receiving a channel switching notification from another on-board communication device during the vehicle-to-vehicle communication via the adhoc communication channel, determining whether to switch channels according to a status of the vehicle-to-vehicle communication currently performed and executing channel switching to the infrastructure communication channel after notifying channel switching to the neighboring on-board communication devices in executing channel switching, wherein the program is further for causing the computer in the roadside communication device to execute functions of:

transmitting, by the roadside communication device, the roadside information including positional information and wireless channel to the on-board communication device of the traveling vehicle, storing, by the roadside communication device, the roadside information in advance and selecting the wireless channel selectively used by the roadside wireless unit and outputting the information, selectively setting, by the roadside communication device, a roadside channel in the roadside wireless unit based on the wireless channel selecting information from the roadside information providing unit and regulating the operation of the roadside wireless unit based thereon, performing, by the roadside wireless unit, wireless communication with the on-board communication device using a first communication channel which is mainly used in the vehicle-to-roadside communication, performing, by the roadside wireless unit, wireless communication with the on-board communication device using a second communication channel which is mainly used in the vehicle-to-vehicle communication, selectively setting, by the roadside communication device, either a roadside first channel communication device or a roadside second channel communication device for the vehicle-to-roadside communication.

9. A vehicle-to-roadside and vehicle-to-vehicle communication program in a vehicle-to-roadside and vehicle-to-vehicle communication system including a plurality of roadside communication devices being arranged on a side of a road, and an on-board communication device mounted on a vehicle which travels with passing through the communication area and being configured to perform a wireless communication by cooperating a vehicle-to-roadside communication between the roadside communication device and the on-board communication device and a vehicle-to-vehicle communication between each of the on-board communication devices, the program causing a computer in the on-board communication device to execute:

received data retrieving control function of retrieving received data sent from the roadside communication device or another on-board communication device which is received at an vehicle side wireless unit via a wireless channel set in advance in the vehicle-to-vehicle communication;

channel selecting determining function of transmitting the received data from the roadside communication device of the retrieved received data to an external connection unit installed in advance, and determining whether switching the wireless channel in communication is necessary or not based on the received data from the roadside communication device and the another on-board communication device in a channel selecting information determining unit;

switching control signal generating function of generating a channel switching control signal in the vehicle side control unit based on a channel switching notification outputted from the channel selecting information determining unit and on-board communication device input data provided from the external connection unit when it is determined that switching of the wireless channel in communication is necessary; and transmission data transmitting control function of activating the vehicle side wireless unit by the generated channel switching control signal to switch for selecting a communication wireless channel, and transmitting the transmission data which is transmitted from the vehicle side control unit towards the another on-board communication device or the roadside communication device via the selected wireless channel;

a mutual communication function of mutually communicating between the roadside communication device and the on-board communication device in the vehicle-to-roadside communication and the vehicle-to-vehicle communication via two wireless channels, which are an infrastructure communication channel and an adhoc communication channel, respectively;

a roadside information transmission function of transmitting the roadside information relating to the vehicle-to-roadside communication periodically to the adhoc communication channel;

a channel switching function of executing channel switching after notifying channel switching to a communicating party via wireless channel in communication when switching the channel from one to the other and continuing the communication; and a determination and channel switching function of, when receiving the roadside information from the roadside communication device or receiving a channel switching notification from another on-board communication device during the vehicle-to-vehicle communication via the adhoc communication channel, determining whether to switch channels according to a status of the vehicle-to-vehicle communication currently performed and executing channel switching to the infrastructure communication channel after notifying channel switching to the neighboring on-board communication devices in executing channel switching, wherein the program is further for causing the computer to execute functions of:

transmitting, by the roadside communication device, the roadside information including positional information and wireless channel to the on-board communication device of the traveling vehicle, storing, by the roadside communication device, the roadside information in advance and selecting the wireless channel selectively used by the roadside wireless unit and outputting information, selectively setting, by the roadside communication device, a roadside channel in the roadside wireless unit based on the wireless channel selecting information from the roadside information providing unit and regulating the operation of the roadside wireless unit based thereon, performing, by the roadside wireless unit, wireless communication with the on-board communication device using a first communication channel which is mainly used in the vehicle-to-roadside communication, performing, by the roadside wireless unit, wireless communication with the on-board communication device using a second communication channel which is mainly used in the vehicle-to-vehicle communication, selectively setting, by the roadside communication device, either a roadside first channel communication device or a roadside second channel communication device for the vehicle-to-roadside communication.

10. A vehicle-to-roadside and vehicle-to-vehicle communication control program in a vehicle-to-roadside and vehicle-to-vehicle communication system including a plurality of roadside communication devices being arranged on a side of a road, and an on-board communication device mounted on a vehicle which travels with passing through the communication area and being configured to perform a wireless communication by cooperating a vehicle-to-roadside communication between the roadside communication device and the on-board communication device and a vehicle-to-vehicle communication between each of the on-board communication devices, the program causing a computer in the on-board communication device to execute:

vehicle-to-vehicle communication starting control function in which the on-board communication device selects an adhoc communication channel as a wireless channel and starts the vehicle-to-vehicle communication in the vehicle-to-vehicle communication;

channel switching determining function of determining whether or not to switch the wireless channel in communication when the on-board communication device receives the roadside information from the roadside communication device or a channel switching notification from another on-board communication device via the adhoc communication channel;

channel switching executing control function of switching the wireless channel in communication from the adhoc communication channel to an infrastructure communication channel after transmitting the channel switching notification to the neighboring on-board communication devices when it is determined to switch the wireless channel in communication; and second channel switching control function of switching to the adhoc communication channel after notifying channel switching to the roadside communication device when the roadside information is no longer received during the vehicle-to-roadside communication via the infrastructure communication channel;

a mutual communication function of mutually communicating between the roadside communication device and the on-board communication device in the vehicle-to-roadside communication and the vehicle-to-vehicle communication via two wireless channels, which are the infrastructure communication channel and the adhoc communication channel, respectively;

a roadside information transmission function of transmitting the roadside information relating to the vehicle-to-roadside communication periodically to the adhoc communication channel;

a channel switching function of executing channel switching after notifying channel switching to a communicating party via wireless channel in communication when switching the channel from one to the other and continuing the communication; and a determination and channel switching function of, when receiving the roadside information from the roadside communication device or receiving a channel switching notification from another on-board communication device during the vehicle-to-vehicle communication via the adhoc communication channel, determining whether to switch channels according to a status of the vehicle-to-vehicle communication currently performed and executing channel switching to the infrastructure communication channel after notifying channel switching to the neighboring on-board communication devices in executing channel switching, wherein the program is further for causing the computer to execute functions of:

transmitting, by the roadside communication device, the roadside information including positional information and wireless channel to the on-board communication device of the traveling vehicle, storing, by the roadside communication device, the roadside information in advance and selecting the wireless channel selectively used by the roadside wireless unit and outputting information, selectively setting, by the roadside communication device, a roadside channel in the roadside wireless unit based on the wireless channel selecting information from the roadside information providing unit and regulating the operation of the roadside wireless unit based thereon, performing, by the roadside wireless unit, wireless communication with the on-board communication device using a first communication channel which is mainly used in the vehicle-to-roadside communication, performing, by the roadside wireless unit, wireless communication with the on-board communication device using a second communication channel which is mainly used in the vehicle-to-vehicle communication, selectively setting, by the roadside communication device, either a roadside first channel communication device or a roadside second channel communication device for the vehicle-to-roadside communication.

11. A vehicle-to-roadside and vehicle-to-vehicle communication system comprising a plurality of roadside communication devices being arranged on a side of a road, and an on-board communication device mounted on a vehicle which travels with passing through the communication area and being configured to perform a wireless communication by cooperating a vehicle-to-roadside communication between the roadside communication device and the on-board communication device and a vehicle-to-vehicle communication between each of the on-board communication devices; wherein the roadside communication device and the on-board communication device are mutually communicable in the vehicle-to-roadside communication and the vehicle-to-vehicle communication via two wireless channels, which are an infrastructure communication channel and an adhoc communication channel, respectively;

the roadside communication device has a function of transmitting roadside information relating to the vehicle-to-roadside communication periodically to the adhoc communication channel; and the on-board communication device is configured to:

execute channel switching after notifying channel switching to a communicating party via wireless channel in communication when switching the channel from one to the other and continue the communication, and when receiving the roadside information from the roadside communication device or receiving a channel switching notification from another on-board communication device during the vehicle-to-vehicle communication via the adhoc communication channel, determine whether to switch channels according to a status of the vehicle-to-vehicle communication currently performed and execute channel switching to the infrastructure communication channel after notifying channel switching to the neighboring on-board communication devices in executing channel switching, wherein the roadside communication device includes, a roadside wireless unit for transmitting the roadside information including positional information and wireless channel to the on-board communication device of the traveling vehicle, a roadside information providing unit for storing the roadside information in advance and selecting the wireless channel selectively used by the roadside wireless unit and outputting the information, and a roadside control unit for selectively setting a roadside channel in the roadside wireless unit based on the wireless channel selecting information from the roadside information providing unit and regulating the operation of the roadside wireless unit based thereon, wherein the roadside wireless unit includes a vehicle side first channel communication device for performing wireless communication with the on-board communication device using the first communication channel which is mainly used in the vehicle-to-vehicle communication, and a vehicle side second channel communication device for performing wireless communication with the on-board communication device using the second communication channel which is mainly used in the vehicle-to-vehicle communication; wherein the vehicle side control unit includes a vehicle side channel selecting device for selectively setting either the vehicle side first channel communication device or the vehicle side second channel communication device for the vehicle-to-roadside communication.

12. A vehicle-to-roadside and vehicle-to-vehicle communication method in a vehicle-to-roadside and vehicle-to-vehicle communication system including a plurality of roadside communication devices being arranged on a side of a road, and an on-board communication device mounted on a vehicle which travels with passing through the communication area and being configured to perform a wireless communication by cooperating a vehicle-to-roadside communication between the roadside communication device and the on-board communication device and a vehicle-to-vehicle communication between each of the on-board communication devices, the method comprising:

setting roadside information including positional information of the roadside communication device and wireless frequency channel to be used in a roadside information providing unit based on input data from an external connection unit installed in advance on the roadside communication device side in the vehicle-to-roadside communication;

sending the set roadside information and a channel selecting signal for selecting a wireless channel to be used in transmission towards a roadside control unit; and selecting a wireless channel to be used to transmit the roadside information when a roadside wireless unit is activated based on a command from the roadside control unit, and transmitting the roadside information to the traveling vehicle via the selected wireless channel;

mutually communicating between the roadside communication device and the on-board communication device in the vehicle-to-roadside communication and the vehicle-to-vehicle communication via two wireless channels, which are an infrastructure communication channel and an adhoc communication channel, respectively;

transmitting the roadside information relating to the vehicle-to-roadside communication periodically to the adhoc communication channel;

executing channel switching after notifying channel switching to a communicating party via wireless channel in communication when switching the channel from one to the other and continuing the communication; and when receiving the roadside information from the roadside communication device or receiving a channel switching notification from another on-board communication device during the vehicle-to-vehicle communication via the adhoc communication channel, determining whether to switch channels according to a status of the vehicle-to-vehicle communication currently performed and executing channel switching to the infrastructure communication channel after notifying channel switching to the neighboring on-board communication devices in executing channel switching, wherein the method further comprises:

transmitting, by the roadside communication device, the roadside information including positional information and wireless channel to the on-board communication device of the traveling vehicle, storing, by the roadside communication device, the roadside information in advance and selecting the wireless channel selectively used by the roadside wireless unit and outputting the information, selectively setting, by the roadside communication device, a roadside channel in the roadside wireless unit based on the wireless channel selecting information from the roadside information providing unit and regulating the operation of the roadside wireless unit based thereon, performing, by the roadside wireless unit, wireless communication with the on-board communication device using a first communication channel which is mainly used in the vehicle-to-vehicle communication, performing, by the roadside wireless unit, wireless communication with the on-board communication device using a second communication channel which is mainly used in the vehicle-to-vehicle communication, and selectively setting, by the roadside communication device, either a vehicle side first channel communication device or a vehicle side second channel communication device for the vehicle-to-roadside communication.

13. A vehicle-to-roadside and vehicle-to-vehicle communication method in a vehicle-to-roadside and vehicle-to-vehicle communication system including a plurality of roadside communication devices being arranged on a side of a road, and an on-board communication device mounted on a vehicle which travels with passing through the communication area and being configured to perform a wireless communication by cooperating a vehicle-to-roadside communication between the roadside communication device and the on-board communication device and a vehicle-to-vehicle communication between each of the on-board communication devices, the method comprising:

retrieving received data sent from the roadside communication device or another on-board communication device which is received at an vehicle side wireless unit via a wireless channel set in advance on the on-board communication device side in the vehicle-to-vehicle communication;

transmitting the received data from the roadside communication device of the retrieved received data to an external connection unit installed in advance, and determining whether switching the wireless channel in communication is necessary or not based on the received data from the roadside communication device and the another on-board communication device in a channel selecting information determining unit;

generating a channel setting signal in the vehicle side control unit based on a channel switching notification outputted from the channel selecting information determining unit and on-board communication device input data provided from the external connection unit when it is determined that switching of the wireless channel in communication is necessary; and activating the vehicle side wireless unit by the generated channel setting signal to set and switch for selecting a communication wireless channel, and transmitting the transmission data which is transmitted from the vehicle side control unit towards the another on-board communication device or the roadside communication device via the selected wireless channel;

mutually communicating between the roadside communication device and the on-board communication device in the vehicle-to-roadside communication and the vehicle-to-vehicle communication via two wireless channels, which are an infrastructure communication channel and an adhoc communication channel, respectively;

transmitting the roadside information relating to the vehicle-to-roadside communication periodically to the adhoc communication channel;

executing channel switching after notifying channel switching to a communicating party via wireless channel in communication when switching the channel from one to the other and continuing the communication; and when receiving the roadside information from the roadside communication device or receiving a channel switching notification from another on-board communication device during the vehicle-to-vehicle communication via the adhoc communication channel, determining whether to switch channels according to a status of the vehicle-to-vehicle communication currently performed and executing channel switching to the infrastructure communication channel after notifying channel switching to the neighboring on-board communication devices in executing channel switching, wherein the method further comprises:

transmitting, by the roadside communication device, the roadside information including positional information and wireless channel to the on-board communication device of the traveling vehicle, storing, by the roadside communication device, the roadside information in advance and selecting the wireless channel selectively used by the roadside wireless unit and outputting the information, selectively setting, by the roadside communication device, a roadside channel in the roadside wireless unit based on the wireless channel selecting information from the roadside information providing unit and regulating the operation of the roadside wireless unit based thereon, performing, by the roadside wireless unit, wireless communication with the on-board communication device using a first communication channel which is mainly used in the vehicle-to-vehicle communication, performing, by the roadside wireless unit, wireless communication with the on-board communication device using a second communication channel which is mainly used in the vehicle-to-vehicle communication, and selectively setting, by the roadside communication device, either a vehicle side first channel communication device or a vehicle side second channel communication device for the vehicle-to-roadside communication.

14. A vehicle-to-roadside and vehicle-to-vehicle communication method in a vehicle-to-roadside and vehicle-to-vehicle communication system including a plurality of roadside communication devices being arranged on a side of a road, and an on-board communication device mounted on a vehicle which travels with passing through the communication area and being configured to perform a wireless communication by cooperating a vehicle-to-roadside communication between the roadside communication device and the on-board communication device and a vehicle-to-vehicle communication between each of the on-board communication devices, the method comprising:

selecting an adhoc communication channel as a wireless channel with the on-board communication device and starting the vehicle-to-vehicle communication in the vehicle-to-vehicle communication;

determining whether or not to switch the wireless channel in communication when the on-board communication device receives the roadside information from the roadside communication device or a channel switching notification from another on-board communication device via the adhoc communication channel;

switching the wireless channel in communication from the adhoc communication channel to an infrastructure communication channel after transmitting the channel switching notification to the neighboring on-board communication devices when it is determined to switch the wireless channel in communication; and switching to the adhoc communication channel after notifying channel switching to the roadside communication device when the roadside information is no longer received during the vehicle-to-roadside communication via the infrastructure communication channel;

mutually communicating between the roadside communication device and the on-board communication device in the vehicle-to-roadside communication and the vehicle-to-vehicle communication via two wireless channels, which are the infrastructure communication channel and the adhoc communication channel, respectively;

transmitting the roadside information relating to the vehicle-to-roadside communication periodically to the adhoc communication channel;

executing channel switching after notifying channel switching to a communicating party via wireless channel in communication when switching the channel from one to the other and continuing the communication; and when receiving the roadside information from the roadside communication device or receiving a channel switching notification from another on-board communication device during the vehicle-to-vehicle communication via the adhoc communication channel, determining whether to switch channels according to a status of the vehicle-to-vehicle communication currently performed and executing channel switching to the infrastructure communication channel after notifying channel switching to the neighboring on-board communication devices in executing channel switching, wherein the method further comprises:

transmitting, by the roadside communication device, the roadside information including positional information and wireless channel to the on-board communication device of the traveling vehicle, storing, by the roadside communication device, the roadside information in advance and selecting the wireless channel selectively used by the roadside wireless unit and outputting the information, selectively setting, by the roadside communication device, a roadside channel in the roadside wireless unit based on the wireless channel selecting information from the roadside information providing unit and regulating the operation of the roadside wireless unit based thereon, performing, by the roadside wireless unit, wireless communication with the on-board communication device using a first communication channel which is mainly used in the vehicle-to-vehicle communication, performing, by the roadside wireless unit, wireless communication with the on-board communication device using a second communication channel which is mainly used in the vehicle-to-vehicle communication, and selectively setting, by the roadside communication device, either a vehicle side first channel communication device or a vehicle side second channel communication device for the vehicle-to-roadside communication.

15. A vehicle-to-roadside and vehicle-to-vehicle communication control program in a vehicle-to-roadside and vehicle-to-vehicle communication system including a plurality of roadside communication devices being arranged on a side of a road, and an on-board communication device mounted on a vehicle which travels with passing through the communication area and being configured to perform a wireless communication by cooperating a vehicle-to-roadside communication between the roadside communication device and the on-board communication device and a vehicle-to-vehicle communication between each of the on-board communication devices, the program causing a computer in the roadside communication device to execute:

roadside information setting function of setting roadside information including positional information of the roadside communication device and wireless frequency channel to be used in a roadside information providing unit based on input data from an external connection unit installed in advance in the vehicle-to-roadside communication;

channel selecting output control function of outputting the set roadside information and a channel selecting signal for selecting a wireless channel to be used in transmission towards a roadside control unit; and roadside information transmitting control function of selecting a wireless channel to be used to transmit the roadside information when a roadside wireless unit is activated based on a command from the roadside control unit, and transmitting the roadside information to the traveling vehicle via the selected wireless channel;

a mutual communication function of mutually communicating between the roadside communication device and the on-board communication device in the vehicle-to-roadside communication and the vehicle-to-vehicle communication via two wireless channels, which are an infrastructure communication channel and an adhoc communication channel, respectively;

a roadside information transmission function of transmitting the roadside information relating to the vehicle-to-roadside communication periodically to the adhoc communication channel;

a channel switching function of executing channel switching after notifying channel switching to a communicating party via wireless channel in communication when switching the channel from one to the other and continuing the communication; and a determination and channel switching function of, when receiving the roadside information from the roadside communication device or receiving a channel switching notification from another on-board communication device during the vehicle-to-vehicle communication via the adhoc communication channel, determining whether to switch channels according to a status of the vehicle-to-vehicle communication currently performed and executing channel switching to the infrastructure communication channel after notifying channel switching to the neighboring on-board communication devices in executing channel switching, wherein the program is further for causing the computer in the roadside communication device to execute functions of:

transmitting, by the roadside communication device, the roadside information including positional information and wireless channel to the on-board communication device of the traveling vehicle, storing, by the roadside communication device, the roadside information in advance and selecting the wireless channel selectively used by the roadside wireless unit and outputting the information, selectively setting, by the roadside communication device, a roadside channel in the roadside wireless unit based on the wireless channel selecting information from the roadside information providing unit and regulating the operation of the roadside wireless unit based thereon, performing, by the roadside wireless unit, wireless communication with the on-board communication device using a first communication channel which is mainly used in the vehicle-to-vehicle communication, performing, by the roadside wireless unit, wireless communication with the on-board communication device using a second communication channel which is mainly used in the vehicle-to-vehicle communication, and selectively setting, by the roadside communication device, either a vehicle side first channel communication device or a vehicle side second channel communication device for the vehicle-to-roadside communication.

16. A vehicle-to-roadside and vehicle-to-vehicle communication program in a vehicle-to-roadside and vehicle-to-vehicle communication system including a plurality of roadside communication devices being arranged on a side of a road, and an on-board communication device mounted on a vehicle which travels with passing through the communication area and being configured to perform a wireless communication by cooperating a vehicle-to-roadside communication between the roadside communication device and the on-board communication device and a vehicle-to-vehicle communication between each of the on-board communication devices, the program causing a computer in the on-board communication device to execute:

received data retrieving control function of retrieving received data sent from the roadside communication device or another on-board communication device which is received at an vehicle side wireless unit via a wireless channel set in advance in the vehicle-to-vehicle communication;

channel selecting determining function of transmitting the received data from the roadside communication device of the retrieved received data to an external connection unit installed in advance, and determining whether switching the wireless channel in communication is necessary or not based on the received data from the roadside communication device and the another on-board communication device in a channel selecting information determining unit;

switching control signal generating function of generating a channel switching control signal in the vehicle side control unit based on a channel switching notification outputted from the channel selecting information determining unit and on-board communication device input data provided from the external connection unit when it is determined that switching of the wireless channel in communication is necessary; and transmission data transmitting control function of activating the vehicle side wireless unit by the generated channel switching control signal to switch for selecting a communication wireless channel, and transmitting the transmission data which is transmitted from the vehicle side control unit towards the another on-board communication device or the roadside communication device via the selected wireless channel;

a mutual communication function of mutually communicating between the roadside communication device and the on-board communication device in the vehicle-to-roadside communication and the vehicle-to-vehicle communication via two wireless channels, which are an infrastructure communication channel and an adhoc communication channel, respectively;

a roadside information transmission function of transmitting the roadside information relating to the vehicle-to-roadside communication periodically to the adhoc communication channel;

a channel switching function of executing channel switching after notifying channel switching to a communicating party via wireless channel in communication when switching the channel from one to the other and continuing the communication; and a determination and channel switching function of, when receiving the roadside information from the roadside communication device or receiving a channel switching notification from another on-board communication device during the vehicle-to-vehicle communication via the adhoc communication channel, determining whether to switch channels according to a status of the vehicle-to-vehicle communication currently performed and executing channel switching to the infrastructure communication channel after notifying channel switching to the neighboring on-board communication devices in executing channel switching, wherein the program is further for causing the computer to execute functions of:

transmitting, by the roadside communication device, the roadside information including positional information and wireless channel to the on-board communication device of the traveling vehicle, storing, by the roadside communication device, the roadside information in advance and selecting the wireless channel selectively used by the roadside wireless unit and outputting the information, selectively setting, by the roadside communication device, a roadside channel in the roadside wireless unit based on the wireless channel selecting information from the roadside information providing unit and regulating the operation of the roadside wireless unit based thereon, performing, by the roadside wireless unit, wireless communication with the on-board communication device using a first communication channel which is mainly used in the vehicle-to-vehicle communication, performing, by the roadside wireless unit, wireless communication with the on-board communication device using a second communication channel which is mainly used in the vehicle-to-vehicle communication, and selectively setting, by the roadside communication device, either a vehicle side first channel communication device or a vehicle side second channel communication device for the vehicle-to-roadside communication.

17. A vehicle-to-roadside and vehicle-to-vehicle communication control program in a vehicle-to-roadside and vehicle-to-vehicle communication system including a plurality of roadside communication devices being arranged on a side of a road, and an on-board communication device mounted on a vehicle which travels with passing through the communication area and being configured to perform a wireless communication by cooperating a vehicle-to-roadside communication between the roadside communication device and the on-board communication device and a vehicle-to-vehicle communication between each of the on-board communication devices, the program causing a computer in the on-board communication device to execute:

vehicle-to-vehicle communication starting control function in which the on-board communication device selects an adhoc communication channel as a wireless channel and starts the vehicle-to-vehicle communication in the vehicle-to-vehicle communication;

channel switching determining function of determining whether or not to switch the wireless channel in communication when the on-board communication device receives the roadside information from the roadside communication device or a channel switching notification from another on-board communication device via the adhoc communication channel;

channel switching executing control function of switching the wireless channel in communication from the adhoc communication channel to an infrastructure communication channel after transmitting the channel switching notification to the neighboring on-board communication devices when it is determined to switch the wireless channel in communication; and second channel switching control function of switching to the adhoc communication channel after notifying channel switching to the roadside communication device when the roadside information is no longer received during the vehicle-to-roadside communication via the infrastructure communication channel;

a mutual communication function of mutually communicating between the roadside communication device and the on-board communication device in the vehicle-to-roadside communication and the vehicle-to-vehicle communication via two wireless channels, which are the infrastructure communication channel and the adhoc communication channel, respectively;

a roadside information transmission function of transmitting the roadside information relating to the vehicle-to-roadside communication periodically to the adhoc communication channel;

a channel switching function of executing channel switching after notifying channel switching to a communicating party via wireless channel in communication when switching the channel from one to the other and continuing the communication; and a determination and channel switching function of, when receiving the roadside information from the roadside communication device or receiving a channel switching notification from another on-board communication device during the vehicle-to-vehicle communication via the adhoc communication channel, determining whether to switch channels according to a status of the vehicle-to-vehicle communication currently performed and executing channel switching to the infrastructure communication channel after notifying channel switching to the neighboring on-board communication devices in executing channel switching, wherein the program is further for causing the computer to execute functions of:

transmitting, by the roadside communication device, the roadside information including positional information and wireless channel to the on-board communication device of the traveling vehicle, storing, by the roadside communication device, the roadside information in advance and selecting the wireless channel selectively used by the roadside wireless unit and outputting the information, selectively setting, by the roadside communication device, a roadside channel in the roadside wireless unit based on the wireless channel selecting information from the roadside information providing unit and regulating the operation of the roadside wireless unit based thereon, performing, by the roadside wireless unit, wireless communication with the on-board communication device using a first communication channel which is mainly used in the vehicle-to-vehicle communication, performing, by the roadside wireless unit, wireless communication with the on-board communication device using a second communication channel which is mainly used in the vehicle-to-vehicle communication, and selectively setting, by the roadside communication device, either a vehicle side first channel communication device or a vehicle side second channel communication device for the vehicle-to-roadside communication.

* * * * *